US006610385B2

(12) United States Patent
Cairo

(10) Patent No.: US 6,610,385 B2
(45) Date of Patent: Aug. 26, 2003

(54) INTEGRAL SURFACE FEATURES FOR CMC COMPONENTS AND METHOD THEREFOR

(75) Inventor: Ronald Ralph Cairo, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/683,384

(22) Filed: Dec. 20, 2001

(65) Prior Publication Data

US 2003/0129338 A1 Jul. 10, 2003

(51) Int. Cl.[7] .......................... B32B 3/00; C03B 29/00; F02C 1/00

(52) U.S. Cl. ....................... 428/172; 428/210; 428/192; 428/213; 29/889.722; 156/89.11; 156/89.26; 156/148; 60/752; 60/753; 60/756

(58) Field of Search ................................ 428/105, 113, 428/74, 166, 702, 210, 156, 172, 213, 192; 60/39.34, 625, 752, 753, 754, 755, 722; 29/888.061, 889.72, 889.721, 889.722; 244/123, 124; 415/175; 139/35; 156/89.11, 89.26, 148

(56) References Cited

U.S. PATENT DOCUMENTS 5,184,455 A * 2/1993 Ewing et al. .............. 60/39.02
5,331,816 A * 7/1994 Able et al. ..................... 60/753
5,709,919 A * 1/1998 Kranzmann et al. .......... 60/752

* cited by examiner

*Primary Examiner*—Donald J. Loney
(74) *Attorney, Agent, or Firm*—Ernest Cusick; Gary M. Hartman; Domenica N. S. Hartman

(57) ABSTRACT

A component formed at least in part by a CMC material and equipped with an integrally-formed surface feature, such as an airflow enhancement feature in the form of a turbulator or flow guide. The CMC material comprises multiple sets of tows woven together to form a preform that is infiltrated with a matrix material. The surface feature is integrally defined at a surface of the cooling passage by an insert member disposed between adjacent tows of at least one of the tow sets. The insert member has a cross-sectional size larger than the adjacent tows, forming a protrusion in the preform that defines the surface feature in the infiltrated, consolidated and cured CMC material.

32 Claims, 1 Drawing Sheet

INTEGRAL SURFACE FEATURES FOR CMC COMPONENTS AND METHOD THEREFOR

BACKGROUND OF INVENTION

1. Field of Invention

The present invention generally relates to air-cooled components, such as combustor liners for gas turbine engines. More particularly, this invention is directed to a process for incorporating surface features along the airflow passages of a component, such as airflow enhancement features to improve the cooling efficiency of the component.

2. Description of the Related Art

Higher operating temperatures for gas turbine engines are continuously sought in order to increase their efficiency. However, as operating temperatures increase, the high temperature properties of the engine components must correspondingly increase. While significant advances have been achieved through formulation of iron, nickel and cobalt-base superalloys, the high temperature properties of such alloys are often insufficient to withstand long exposures to operating temperatures within the turbine, combustor and augmentor sections of some high-performance gas turbine engines. As a result, internal cooling of components such as combustion liners, blades (buckets) and nozzles (vanes) is often employed, alone or in combination with a thermal barrier coating (TBC) system that thermally protects their exterior surfaces. Effective internal cooling often requires a complex cooling scheme in which air is forced through passages within the component and then discharged through cooling holes at the component surface.

The performance of a turbine component is directly related to the ability to provide a generally uniform surface temperature with a limited amount of cooling air. To promote uniform convective cooling of the component interior, it is conventional to cast airflow enhancement features, such as turbulators (trip strips) and flow guides, on the surfaces of the component that define the cooling passages. The size, shape and placement of the airflow enhancement features affect the amount and distribution of air flow through the cooling circuit and across the external surfaces downstream of the cooling holes, and as such can be effective in significantly reducing the service temperature of the component.

Ceramic matrix composite (CMC) materials have been considered for combustor liners and other high-temperature components. Continuous fiber-reinforced CMC materials are typically woven from tows (bundles of individual filaments) using conventional textile weave patterns, in which two or more sets of tows are woven, with the individual tows of each set passing over and under transverse tows of the other set or sets. As with air-cooled components formed of metal alloys, it is desirable to incorporate airflow enhancement features in air-cooled CMC components. However, because CMC materials exhibit relatively poor interlaminar tension and shear strengths, airflow enhancement features and other surface features cannot be reliably attached using secondary attachment manufacturing procedures if the component is intended for use in the high thermal strain environment of a gas turbine engine. Moreover, because of tow size and weave limitations, it is difficult to weave small geometry turbulators and flow guides (typically projecting from the surrounding surface a distance of about 0.3 to about 2.0 mm) as integral features of a CMC component. Consequently, while airflow enhancement features of the type used with air-cooled metal components can generally be incorporated in the metal casting process so as to be integral with the primary component, attempts to design integral turbulators, flow guides and other surface features in CMC materials have proven problematic. Faithfully reproducing turbulators and other extremely small-scale, detail geometric features in continuous fiber-reinforced CMC materials is particularly difficult.

In view of the above, while CMC materials offer the capability of significantly increasing the maximum operating temperatures sustainable by turbine and other high-temperature components, it would be desirable to incorporate airflow enhancement features in air-cooled CMC components in order to further extend component life and increase engine efficiency.

SUMMARY OF INVENTION

According to the present invention, there is provided an air-cooled component formed at least in part by a CMC material, and having at least one cooling passage equipped with an integrally-formed surface feature, such as an airflow enhancement feature. The CMC material comprises at least first and second sets of tows woven together to form a preform that is infiltrated with a matrix material. The tows within each set are side-by-side to each other, but transverse to tows of the other set, with tows of each set passing over and under transverse tows of the other. The surface feature is integrally defined at a surface of the cooling passage by an insert member disposed between adjacent tows of at least the first set of tows. In the method of forming the integral surface feature, the insert member is placed between the adjacent tows of the first set of tows during the weaving process, preferably when forming the outermost layer (lamina) of the preform. The insert member has a cross-sectional size larger than the adjacent tows, thereby forming a protrusion in the preform and, after infiltration, consolidation and curing, the surface feature in the surface of the CMC material. The surface feature projects into the cooling passage relative to the immediately surrounding surface region of the passage surface.

In view of the above, the present invention entails integrally forming one or more surface features, particularly airflow enhancement features such as turbulators and flow guides, by strategically placing insert members in the CMC preform during the initial preforming step of the CMC process. The insert member is able to create a functional turbulator or flow guide in the form of a permanent integral surface feature after the woven tows are fully processed, including infiltration with a suitable matrix material, densification and consolidation, and curing of the matrix material to form the CMC. As a result of being integrally formed, the surface feature exhibits better structural integrity as compared to a surface feature added to a CMC by a secondary attachment technique. The manner in which the surface feature is an integral feature retained by the woven fiber network provides a load shielding mechanism, capable of keeping interlaminar tension and shear stresses on the surface feature well within the structural capabilities of the CMC material.

Other objects and advantages of this invention will be better appreciated from the following detailed description.

DETAILED DESCRIPTION

The present invention will be described in reference to a combustor liner 10, a portion of which is represented in cross-section in FIG. 1, though the invention is equally applicable to airfoil components such as a turbine blades and vanes. While particularly useful for forming airflow enhancement features, such as turbulators and flow guides for air-cooled components that operate within a thermally hostile environment, the invention is generally applicable to a variety of CMC components in which a small-scale surface feature is desired. In addition, while CMC materials are of particular interest, the invention is applicable to any continuous fiber-reinforced composite material, including polymer matrix and bismalimide matrix materials.

Figure 1:
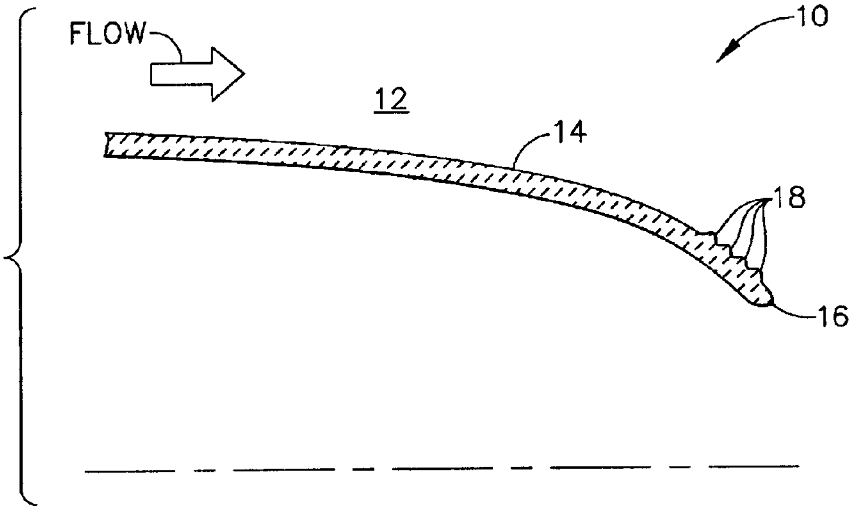
FIG. 1 is a cross-sectional representation of a CMC combustor liner having a cooling passage equipped with integral turbulators in accordance with this invention.

As represented in FIG. 1, the liner 10 has a cooling passage 12 defined by a surface 14, and a trailing edge 16 near which a number of turbulators 18 are formed. The turbulators 18 are shown as being disposed transverse to the airflow direction through the passage 12, as indicated by the arrow in FIG. 1. However, it is foreseeable that the turbulators 18 could be oriented perpendicular or parallel to the airflow direction (to serve as flow guides), may be continuous or discontinuous (interrupted), and may be V-shaped or have another nonlinear shape. According to known practice, the turbulators 18 are intended to disrupt laminar airflow over the surface 14 in order to promote convection heat transfer from the liner 14 to the air. For this purpose, the turbulators 18 preferably project at least 0.30 mm from the surface 14, with a suitable height being about 0.50 to about 2.0 mm above the surface 14.

Figure 2:
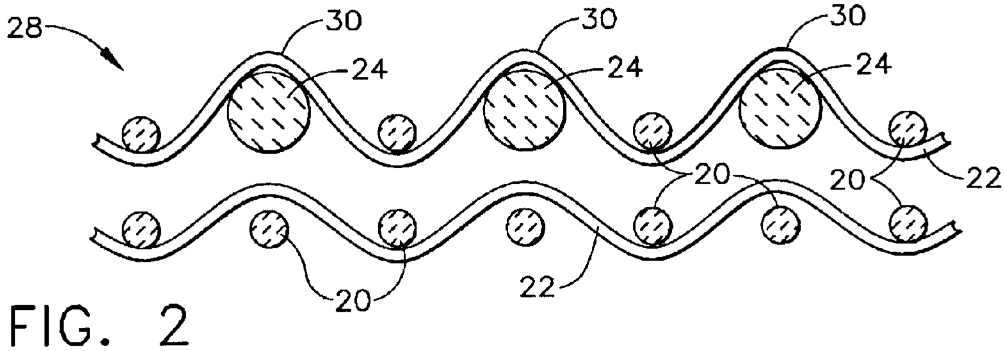
FIGS. 2 and 3 are cross-sectional representations of wall portions of preforms for the liner, in which surface features are formed by a stuffer tow and an insert, respectively, in the preform architecture in accordance with two embodiments of this invention.
Figure 3:
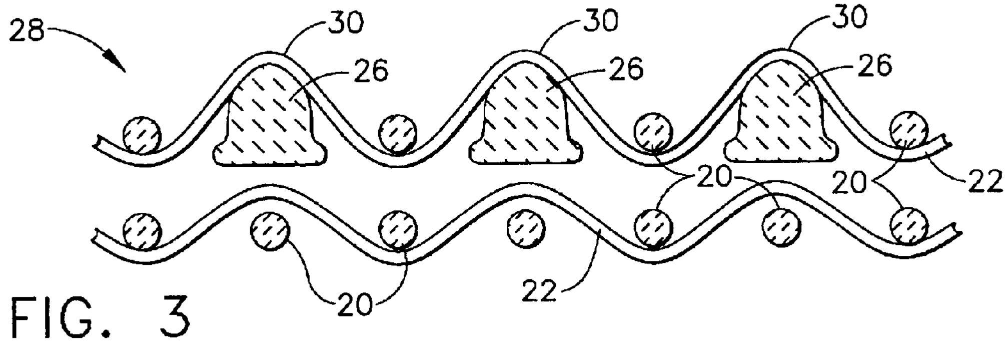

The liner 10 is formed of a continuous fiber-reinforced CMC material, such as silicon carbide, silicon nitride or silicon fibers in a silicon carbide, silicon nitride and/or silicon-containing matrix material. The surface 14 of the liner 10 may be protected by a thermal barrier coating (TBC) or an environmental barrier coating (EBC), such as a thermally-insulating ceramic layer adhered to the surface 14 with a bond coat (not shown). Two embodiments of the invention are represented in FIGS. 2 and 3, which depict woven architectures of preforms 28 for the CMC material prior to infiltration by the matrix material, and two types of inserts 24 and 26 suitable for forming the turbulators 18 of FIG. 1. In each of FIGS. 2 and 3, the architectures of the preforms 28 comprise multiple layers (laminae), each containing sets of woven tows 20 and 22. The tows 20/22 within each set are generally oriented side-by-side and parallel to each other, and transverse to the tows 20/22 of the other set, e.g., the tows 20 seen in cross-section in FIGS. 2 and 3 are perpendicular to the tows 22 seen lengthwise. The tows 20 and 22 within a given lamina can be seen to pass over and under each other. While the tows 20/22 are shown as passing over and under individual transverse tows 20/22, it is foreseeable that each tow 20/22 could pass over one or more transverse tows 20/22, and then under one or more transverse tows 20/22, in accordance with other known weave patterns.

In FIG. 2, multiple “stuffer” tow inserts 24 are shown as being incorporated into the architecture of the preform 28, while in FIG. 3 monolithic ceramic inserts 26 are shown. Suitable materials for the tow inserts 24 include the same material as the fiber reinforcement (tows 20 and 22) of the CMC material, e.g., silicon carbide, silicon nitride or silicon fibers, for thermal compatibility, though it is foreseeable that other materials could be used as long as the chosen material is chemically suitable with the service environment of the liner 10 and compatible with the matrix material of the CMC. Similarly, suitable materials for the inserts 26 include monolithic castings of the same material as the matrix material of the CMC material, e.g., silicon carbide, silicon nitride or silicon-containing materials, though again it is foreseeable that other materials could be used. In each case, the tow inserts 24 and monolithic inserts 26 are used in place of a tow of the first set of tows 20, and therefore positioned between an adjacent pair of tows 20 so that the tow insert 24 or monolithic insert 26 passes over and under the transverse tows 22 of the second set.

As apparent from FIGS. 2 and 3, the diameters of the inserts 24 and 26 are larger than those of the adjacent tows 20, such that the inserts 24 and 26 define protrusions 30 at the surface of the preform 28. Following infiltration with the matrix material, consolidation, densification, and then curing to form the liner 10, the size and shape of the inserts 24 and 26 determine the extent to which the turbulators 18 project above the surrounding surface 14 of the liner 10. Tows, typically circular in cross-section before compaction, will generally assume an oval shape after compaction. As such, a suitable size for a tow insert 24 is at least 50% larger, preferably about 100% to about 700% larger, than the diameter of the tows 20 and 22. On the other hand, a precast monolithic insert 26 generally maintains its original height after compaction. Therefore, a suitable size for a monolithic insert 26 is at least 25% larger, preferably about 50% to about 350% larger, than the diameter of the tows 20 and 22.

Preferences can exist for the use of a tow insert 24 or monolithic insert 26 based on the desired characteristics of a particular surface feature. For example, if a continuous surface feature is desired, a tow insert 24 may be more convenient, while a discontinuous surface feature may be more readily formed with a row of spaced-apart monolithic inserts 26. If a desired surface feature can be formed with either a tow insert 24 or monolithic insert 26, there may be a preference for using a tow insert 24 because of its greater compliance, allowing for more intimate contact with adjacent tows during processing. Potential benefits of intimate tow contact include lower void content or porosity, corresponding to higher interlaminar strengths and through-thickness thermal conductivity.

The tow inserts 24 and monolithic inserts 26 are shown in FIGS. 2 and 3, respectively, as placed between adjacent tows 20 of only the outermost lamina of the architecture. Depending on the relative diameters of the inserts 24 and 26, it is foreseeable that the inserts 24 and 26 could be incorporated into one or more inner lamina, in addition to or in place of the outermost lamina to provide additional flexibility in the final projected height and shape of the turbulator 18. Furthermore, though FIGS. 2 and 3 show the tow inserts 24 used separately from the monolithic inserts 26, it is foreseeable that the inserts 24 and 26 could be used together in a single component. For example, because of the difference in their effect on the final size of the turbulator 18, it may be,advantageous to use both tow inserts 24 and monolithic inserts 26 to enable the height of the desired surface feature to be fine tuned for a specific application, such as matching specific design, cost or compatibility constraints, or optimizing material, structural or component response.

As noted above, following the fabrication of the preform 28 by laying up a desired number of lamina, the preform 28 is infiltrated with the desired matrix material in accordance with any suitable technique, after which the infiltrated preform undergoes consolidation, densification, and curing to form the CMC material. As known in the art, appropriate processing parameters, including curing (firing) temperature, will depend on the particular composition of the CMC material, and therefore will not be discussed here.

In view of the above, the process of this invention enables turbulators and other surface features to be selectively formed essentially anywhere in a composite material by strategically placing inserts in the composite preform. Turbulators 18 defined by inserts such as the tow inserts 24 and monolithic inserts 26 described above are permanent integral surface features of the CMC, retained by the woven fiber network of the preform 28 to provide a load shielding mechanism that reduces interlaminar tension and shear stresses on the turbulators 18. As a result, the turbulators 18 exhibit better structural integrity as compared to turbulators that are added by a secondary attachment technique.

While the invention has been described in terms of a preferred embodiment, it is apparent that other forms could be adopted by one skilled in the art. For example, while the term turbulator was used in reference to the Figures, the teachings of the invention are applicable to the fabrication of other surface features in CMC materials. Therefore, the scope of the invention is to be limited only by the following claims.

What is claimed is:

1. An air-cooled component comprising:

at least one cooling passage defined by a surface of the component, at least a portion of the surface being defined by a composite material comprising at least first and second sets of tows woven together within a matrix material, the tows of the first set being side-by-side to each other, the tows of the second set being side-by-side to each other and transverse to the tows of the first set, the tows of the second set passing over and under tows of the first set; and a surface feature integrally defined at the surface of the cooling passage by at least a portion of at least one of the tows of the second set that passes over an insert member disposed between at least two adjacent tows of the first set of tows, the insert member having a cross-sectional size larger than the adjacent tows of the first set so that the insert member causes the portion of the at least one tow of the second set to project into the cooling passage relative to an immediately surrounding surface region of the surface.

2. An air-cooled component according to claim 1, wherein the insert member is a cast ceramic insert disposed parallel to and between the adjacent tows, and passes over and under transverse tows of the second set of tows.

3. An air-cooled component according to claim 2, wherein the cast ceramic insert and the matrix material are formed of the same material.

4. An air-cooled component according to claim 1, wherein the insert member is a tow member disposed parallel to and between the adjacent tows, and passes over and under transverse tows of the second set of tows.

5. An air-cooled component according to claim 4, wherein the tow member is formed of the same material as the tows of the first and second sets.

6. An air-cooled component according to claim 1, wherein the insert member is present in the composite material in place of a tow of the first set of tows, and passes over and under transverse tows of the second set of tows.

7. An air-cooled component according to claim 1, wherein the insert member is oriented oblique to an airflow direction through the cooling passage.

8. An air-cooled component according to claim 1, wherein the component is a combustor liner of a gas turbine engine.

9. An air-cooled component according to claim 1, wherein the component is an airfoil of a gas turbine engine.

10. An air-cooled component according to claim 1, wherein the composite material is a ceramic matrix composite material.

11. An air-cooled combustor liner of a gas turbine engine turbine, the combustor liner having a trailing edge and at least one cooling passage defined by a surface of the combustor liner at the trailing edge, the combustor liner being formed of a continuous fiber-reinforced ceramic matrix composite material comprising at least one insert member and at least first and second sets of tows woven together within a ceramic matrix material, the tows of the first set being side-by-side to each other, the insert member being between adjacent tows of the first set, the tows of the second set being side-by-side to each other and transverse to the insert member and the tows of the first set, a plurality of the tows of the second set passing over and under the insert member and the tows of the first set, the insert member having a cross-sectional size larger than the adjacent tows of the first set so that portions of the plurality of the tows of the second set define an integral airflow enhancement feature on the surface of the combustor liner that projects into the cooling passage relative to an immediately surrounding surface region of the surface.

12. An air-cooled combustor liner according to claim 11, wherein the insert member is a cast ceramic insert.

13. An air-cooled combustor liner according to claim 12, wherein the cast ceramic insert is formed of the same material as the ceramic matrix material.

14. An air-cooled combustor liner according to claim 11, wherein the insert member is a tow member disposed parallel to and between the adjacent tows.

15. An air-cooled combustor liner according to claim 14, wherein the tow member is formed of the same material as the tows of the first and second sets.

16. An air-cooled combustor liner according to claim 11, wherein the insert member is oriented oblique to an airflow direction through the cooling passage.

17. A method of forming an integral surface feature in an air-cooled component having at least one cooling passage defined by a surface of the component, at least a portion of the surface being formed by a composite material comprising a preform in a matrix material, the preform comprising at least first and second sets of tows woven together, the tows of the first set being side-by-side to each other, the tows of the second set being side-by-side to each other and transverse to the tows of the first set, the tows of the second set passing over and under tows of the first set, the method comprising the step of defining the integral surface feature at the surface of the cooling passage by placing an insert member between at least two adjacent tows of at least the first set of tows, the insert member having a cross-sectional size larger than the adjacent tows of the first set so that at least a portion of at least one of the tows of the second set passes over the insert member to form a protrusion in the preform and define the surface feature in the composite material, the surface feature projecting into the cooling passage relative to an immediately surrounding surface region of the surface.

18. A method according to claim 17, wherein the insert member is formed of a cast ceramic insert, disposed parallel to and between the adjacent tows, and passes over and under transverse tows of the second set of tows.

19. A method according to claim 18, wherein the cast ceramic insert and the matrix material are formed of the same material.

20. A method according to claim 17, wherein the insert member is a tow member disposed parallel to and between the adjacent tows, and passes over and under transverse tows of the second set of tows.

21. A method according to claim 20, wherein the tow member is formed of the same material as the tows of the first and second sets.

22. A method according to claim 17, wherein the insert member is present in the composite material in place of a tow of the first set of tows, and passes over and under transverse tows of the second set of tows.

23. A method according to claim 17, wherein the insert member is placed oblique to an airflow direction through the cooling passage.

24. A method according to claim 17, wherein the component is a combustor liner of a gas turbine engine.

25. A method according to claim 17, wherein the component is an airfoil of a gas turbine engine.

26. A method according to claim 17, wherein the composite material is a ceramic matrix composite material.

27. A method of forming an integral airflow enhancement feature in an air-cooled combustor liner of a gas turbine engine turbine, the combustor liner having a trailing edge and at least one cooling passage defined by a surface of the combustor liner at the trailing edge, the combustor liner being formed of a continuous fiber-reinforced ceramic matrix composite material, the method comprising the steps of:

forming a preform by weaving at least first and second sets of tows together, the tows of the first set being side-by-side to each other, the tows of the second set being side-by-side to each other and transverse to the tows of the first set, the tows of the second set passing over and under tows of the first set, wherein an insert member is placed between adjacent tows of at least the first set of tows so that a plurality of the tows of the second set pass over and under the insert member, the insert member having a cross-sectional size larger than the adjacent tows of the first set so that portions of the plurality of the tows of the second set form a protrusion in the preform;

infiltrating the preform with a ceramic matrix material; and then heating the preform to form the ceramic matrix composite material, the protrusion defining the integral airflow enhancement feature at the surface of the cooling passage, the airflow enhancement feature projecting into the cooling passage relative to an immediately surrounding surface region of the surface.

28. A method according to claim 27, wherein the insert member is a cast ceramic insert.

29. A method according to claim 28, wherein the cast ceramic insert is formed of the same material as the ceramic matrix material.

30. A method according to claim 27, wherein the insert member is a tow member.

31. A method according to claim 30, wherein the tow member is formed of the same material as the tows of the first and second sets.

32. A method according to claim 27, wherein the insert member is oriented oblique to an airflow direction through the cooling passage.

* * * * *